United States Patent [19]
Zerafati-Jahromi et al.

[11] Patent Number: 5,945,133
[45] Date of Patent: Aug. 31, 1999

[54] INJECTION MOLDING MACHINE WITH NON-INTERMESHING TWIN SCREW COMPOUNDER FEEDER

[76] Inventors: Mohammad Saeid Zerafati-Jahromi, 2740 W. Country Club Rd., Philadelphia, Pa. 19131; David Bigio, 4856 Sweetbirch Dr., Rockville, Md. 20853

[21] Appl. No.: 08/939,528

[22] Filed: Sep. 29, 1997

[51] Int. Cl.$^6$ .................................................. B29C 45/00
[52] U.S. Cl. ........................................... 425/204; 425/542
[58] Field of Search .................................. 425/204, 205, 425/542, 379.1

[56] References Cited

U.S. PATENT DOCUMENTS

| | | |
|---|---|---|
| 4,802,140 | 1/1989 | Dowling . |
| 5,108,188 | 4/1992 | Peter et al. ............................. 425/204 |
| 5,415,473 | 5/1995 | Nakano et al. .......................... 425/204 |

OTHER PUBLICATIONS

D. Bigio et al., "Starve–fed Flow in Co–Rotating Twin Screw Extruders," Intern. Polymer Processing VII (1992) 2, pp. 111–115.

D. Bigio et al., "Mixing in Non–Intermeshing Twin Screw Extruders," Intern. Polymer Processing VI (1991) 2, pp. 172–176.

R.J. Nichols et al., "Compounding Glass–Fiber Reinforced Nylon," Plastics Compounding, vol. 9, No. 4, (Jul./Aug. 1986).

Robert Jerman, "A Mathematical Model for Non–Newtonian Melt Flow . . . in Non–Intermeshing Twin Screw Extruders," SPE Antec (1986), pp. 99501001.

Carl Hagberg et al., "Scaleup of Dispersive Mixing Cylindrical Compounders in CRNI Twin Screw Extruders," SPE Antec (1995), pp. 333–339.

*Primary Examiner*—Tim Heitbrink
*Attorney, Agent, or Firm*—Watson Cole Grindle Watson, P.L.L.C.

[57] ABSTRACT

A compounder feeder for mixing and then injecting materials such as polymers and glass fibers into a female die mold includes first and second parallel screws which have interengaging spur gears and external mixing discs, the mixing discs of one screw not engaging the mixing discs of the second screw, a drive motor for rotating the first screw and a drive cylinder for moving the second screw axially toward and away from the female die mold to inject mixed material directly therein.

6 Claims, 3 Drawing Sheets

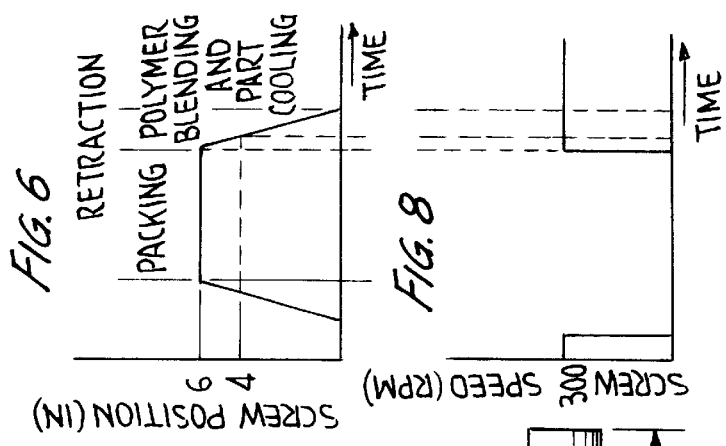
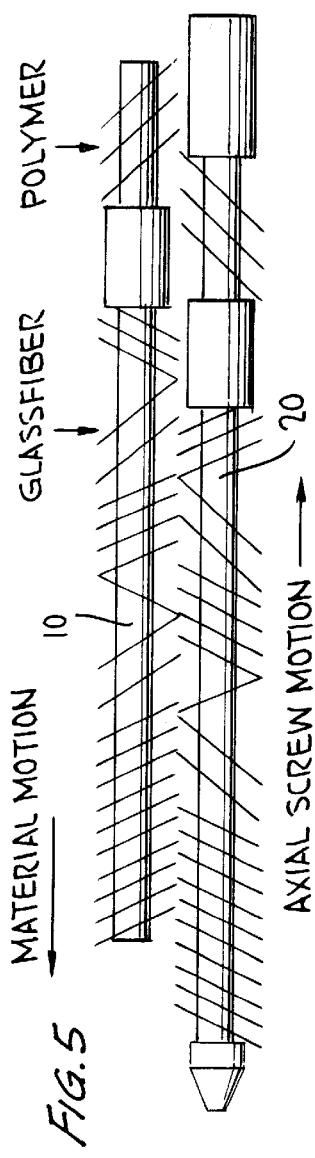
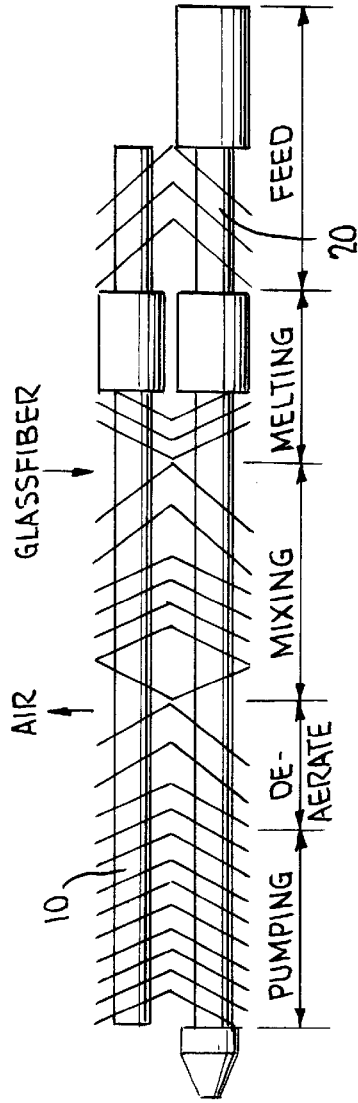
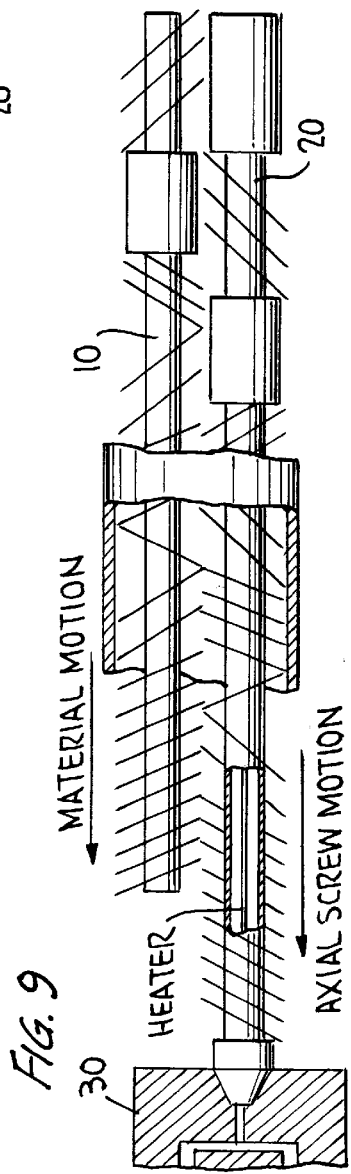
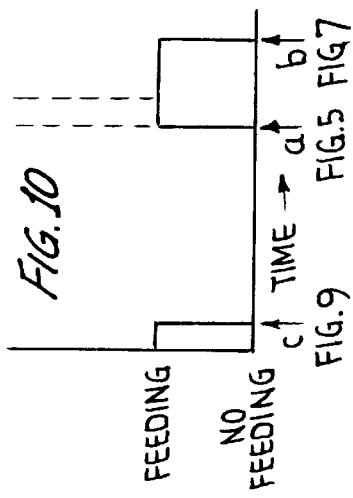

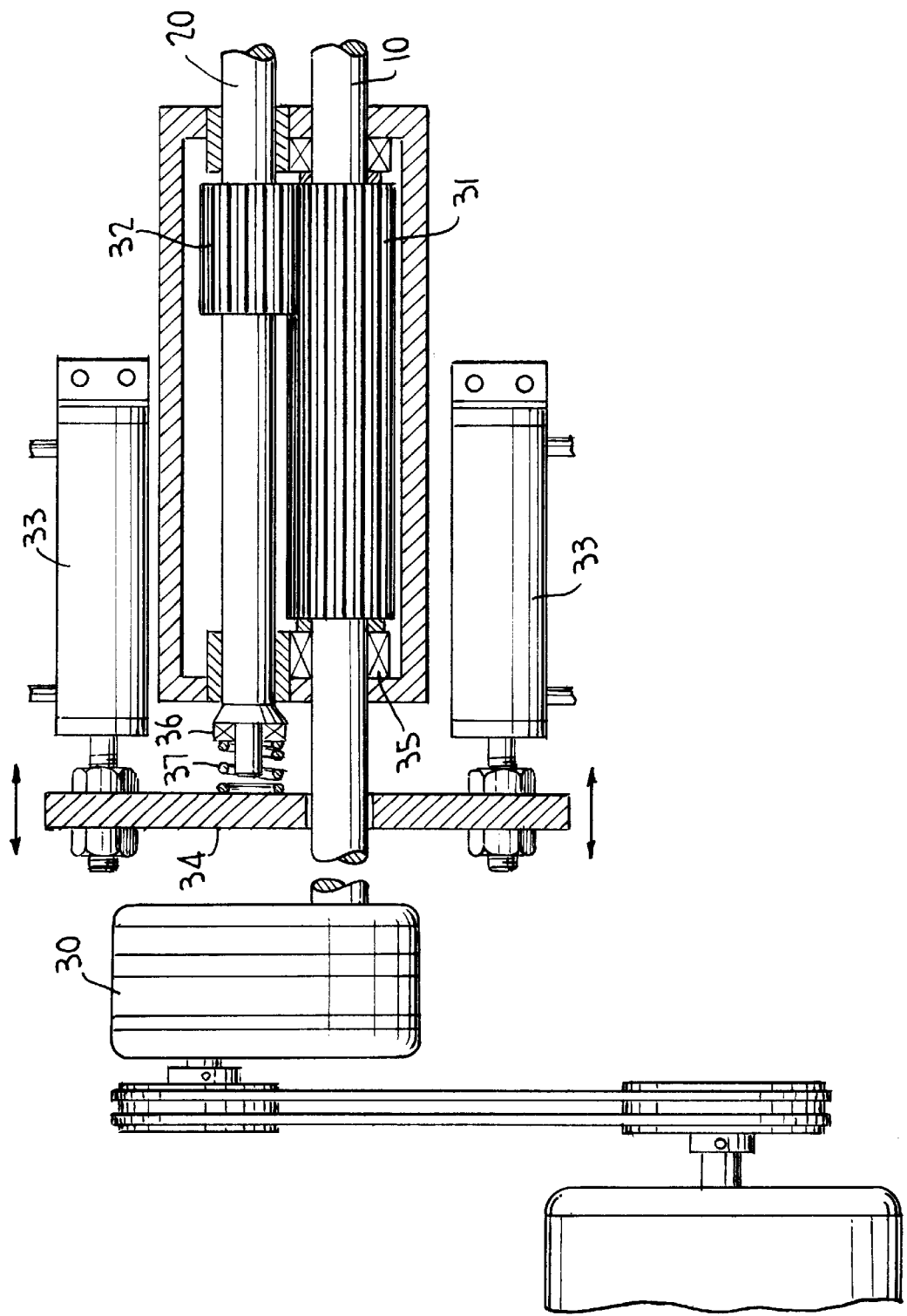

INJECTION MOLDING MACHINE WITH NON-INTERMESHING TWIN SCREW COMPOUNDER FEEDER

BACKGROUND OF THE INVENTION

FIELD OF THE INVENTION

The present invention relates to molding machines, and more particularly to injection molding machines.

THE PRIOR ART

In 1992 the world production of plastics reached 102 million $m^3$/year (total value of over $300 billion), while production of steel was 50 million $m^3$/year (total value of about $125 billion). Furthermore, from 1980 to 1990 plastics production increased by 62% while that of steel decreased by 21%. It is clear that polymers are the fastest growing structural materials. Polymer alloys and blends constitute more than 30% of the commercial polymer market, and with the constant annual growth of some 9% (four-fold of the growth rate of the plastics industry as a whole), their importance is destined to increase.

The number of polymer blend patents issued each year has continued to increase rapidly. In 1993 it reached 3000 (at least 50% from 26 major polymer manufacturers in Japan), representing the outcome of multi-billion dollar investments in industrial research. Obviously, to justify these expenditures, the blends must provide appropriate returns. Indeed, some of these materials achieved spectacular financial success. It was reported that by 1982 the annual global sales of PPE/PS blends exceeded one billion dollars.

It has been recognized that blending offers several economic benefits. For example, it makes it possible to generate, rapidly and economically, a desired set of properties: mechanical, chemical, barrier to permeation by gases or liquids, etc., fulfilling customer requirements. It also offers better processability of difficult-to-form, high performance polymers, by reducing the viscosity and/or the processing temperature. The achieved improvement in processability leads to better product uniformity, and therefore to reduction of scrap. The inherent recyclability of thermoplastic polymer blends achieved by regeneration of morphology, as well as enhanced plant flexibility and productivity, translate into profitability.

With the growing importance of reactive processing, the blending technology makes it possible to offer new types of materials, characterized by controlled chemical constitution and morphology, which can be precisely tailored to specific requirements. There is a growing need for cost-competitive materials where the total cost-to-performance ratio encompasses all aspects: material, compounding, forming, assembling, and recycling costs. As the history of polymer blends indicates, the blending technology is particularly well suited to accomplish this task.

Analysis of more recent patents indicates that processability is becoming the most important property. This is understandable since the emphasis continuously shifts to high performance, specialty resins requiring high processing temperatures and pressures. Since frequently the processing temperature is near or even above the decomposition temperature, the blending constitutes the only sensible solution. It is expected that in the future, electrically, magnetically, and optically active polymeric blends will also become important.

From time to time in applied science there is a condition where technology greatly lags practice. The injection molding field is at such a nexus. The nature of the industry has drastically changed, but the content of the published research has not. Over the past 7–9 years in the plastics field, product performance and properties have been obtained by blending, alloying and reactive compounding, rather than creating new polymers. One reason is that any new product requires an entire vertical chain of suppliers and customers in order to bring the product to market. This process is expensive and time consuming. Furthermore, the new polymers may require more complex architecture in order to satisfy the performance requirements. There is also an inverse relationship between polymer complexity and recyclability.

Turning now to the molding field, a vast majority of the current literature in the field of injection molding is oriented towards the mold end of the operation. A review of the past 7 years of the Society of Plastics Engineers Annual Technical Conference proceedings reveals that a full third of the articles focus on injection molding, but that over 95% of those articles deal with the mold processes alone. The few papers that address the screw part of the machine often are focused on control algorithms and consider the screw part as a black box. This was sufficient when injection molders were primarily processing homopolymers or special copolymers, where the screw part of the machine did very little to alter the morphology. This is no longer true. Dow Chemical in Europe is developing the expertise to have its customers self-color (mix master batch with virgin resin) in the injection molding machine. This will reduce customer's costs, reduce recycle problems, and improve product properties by the elimination of one heat cycle (the extrusion step). Black & Decker experienced a difficult development period in the mixing uniformity of the yellow color for the DeWalt line of products. Various screw manufacturers, like Spirex, have attempted to address the mixing issues in the injection molding machine. Most of the work has been heuristic, lacking a fundamental scientific basis. Furthermore, much of the current research in blending of polymers seeks to develop stable morphologies through compatibilization or reactive processing, so that the properties survive through the injection molding cycle.

Since the current trend of the industry is to satisfy customer product requirements through blending and reactive compatibilization, the demand for mixing performance during the process has expanded. Currently, the material path for production of the engineering plastics in the polymer industry encompasses three steps: 1) Basic Resin Synthesis-Produces the base versions of a polymer (homopolymer), whether a commodity or an engineering polymer. The process is characterized, often by the large-scale mass production of the polymer and is usually done by major petrochemical companies like Exxon, Shell, Monsanto, etc. 2) Extrusion-Production of specific polymer with particular morphology and properties for final process (addition of fillers, colorants, and other minor components for specific applications). PVC, for example, requires up to 15 different additives to be blended into the basic polymer to produce the desired properties. Since this step requires extensive mixing and compounding, a machine like a co-rotating twin screw extruder would be used. An extrusion line with a 57 mm machine, with a capacity of 300 lb./hr., would cost over $500,000. 3) Injection Molding—The pellets are purchased from the compounder and then processed into the final part. Most of the technical emergencies a scientist working for a resin producer solves is for an injection molder, when their final product is not to specification.

Schematically the material flow in the polymer industry is shown in FIG. 1. FIG. 1 shows the inherent inefficiencies of the industry. Each step adds to the base material at the cost of energy consumption, heavy machinery investment and any resultant off-specification material, which constitutes the recycle stream. Also, many processes in the extrusion and injection molding steps are duplicates of each other. Each machine must melt, pressurize and pump the material. The existing injection molding machines have a single screw; these machines are inherently poor mixers. Blending and compounding have to be performed in a twin screw machine which has superior mixing characteristics. By having to go through the extrusion step, though, the material goes through another heat cycle, which degrades the material and another recycle stream comes in to existence.

SUMMARY OF THE INVENTION

We have created a novel design for the next generation of injection molding machine: a one stage non-intermeshing twin screw injection molding machine, and have established the mixing protocol in the injection molding environment. Implementation of this novel design will obviate the extrusion step in many applications (see FIG. 2).

The advantages of this novel injection molding machine design are:

1) Elimination of the extrusion step in the process:
   Compounding in one machine eliminates the middleman (compounding companies), which could, in some cases, save up to 40% of the price of the material and also reduce the magnitude of the molders' material inventory. For example, polycarbonate (PC) sells for $1.64/lb and ¼" length fiberglass sells for $1.00/lb. The material cost for a 20% glass filled PC would be $1.51; whereas, the market price is $2.12 which represents profit. The implementation of the design is economical because the major parts of the extrusion machine (i.e., drive system, barrel, heating, screw and control systems) already exist in the injection molding machine.

2) Reduction in energy consumption:
   Removing the duplicate steps such as melting, pumping, cooling, mixing and material handling will result in substantial energy savings.

3) Improvement in material properties:
   Polymers are heat- and shear-sensitive materials. Reduction of the heat and shear history by elimination of the extrusion step will result in improvement in the physical and chemical properties of the polymer.

4) Reduction in recycle streams:
   Each processing step produces scrap and off-specification parts. Elimination of a processing step naturally reduces the amount of waste. Moreover, another advantage will be the possibility of on-line control of the properties of the material, allowing for the correction of any problem within a few machine cycles. The existing practice in the molding industry is that if the resin does not perform to expectation, then the problem is referred to the compounder or resin producer. If the problem can not be resolved for any reason, then the whole order is sent back (which usually ends up in the recycle stream) and the molder must wait until a new batch is compounded and shipped (which might or might not solve the processing problem). For complex applications this process can occur several times before being resolved.

5) Real-time control of the product quality:
   Since all of the blending is occurring on the injection molding machine, the operator has more control over product properties and can make on-line adjustments to the quantities of the ingredients used for blending the material. This substantially reduces the rejected resins and improves the batch to batch uniformity. Moreover, the properties of the product (e.g., strength, impact resistance, shrinkage, etc.) can be fine-tuned or modified in situ without the need to order new formulation from the compounder or resin manufacturer. This will minimize the material requirements for the various molders' products.

6) Knowledge base model for the morphology development in the injection molding machine:
   With the rapid increase in the use of compounded materials for production of injection molded parts, study of the morphology development in the injection molding machine and the effect of the processing on it becomes essential. The effect of the processing conditions on the properties of the polymer is a well known fact in the extrusion industry. However, for various reasons, the injection molding industry has ignored the role of processing in the product quality until recently.

7) Reduction of the length of the machine:
   This is an important concern for the injection molding industry due to the space restrictions and design limitations caused by the large size of the existing machines. The standard length to diameter ratio of the screw, L/D, for an injection molding machine is around 24. Our design can perform the same job in half of this length. One reason is the melting mechanism in the twin screw extruder typically occurs in half 1–2L/D (versus 6L/D for a single screw extruder) and the mixing lengths can be less.

One embodiment of the invention is a one-step solids addition, e.g., glass fiber addition, to polypropylene and polyamide (nylon). There are huge injection molding markets for each system. Solids-filled polypropylene often used to replace more expensive engineering blends. Glass-fiber filled nylon is used extensively in the automotive industry. The goal in glass fiber addition is to improve product properties; the magnitude of the improvement is directly related to fiber length. Currently, the glass fibers are compounded in the extrusion step, then pelletized (which reduces the average fiber length). The pellets are added to the injection molding machine, where they undergo the melting phase (usually the highest energy input to the polymer-fibers), pumped through the runners and then molded. In comparison, in our invention the glass fibers can be added in the injection molding step near the end of the screw, prior to injection into the mold.

1) The drive train for the non-intermeshing twin screw machine requires the integration of the drive systems used by injection molding and a specially designed gear box inspired by the extrusion application. The design addresses the intermittent operation and allows for the reciprocation and rotation of one screw relative to the other.

2) In conjunction with the design issues associated with reciprocating one screw, the design is able to perform the pumping of the polymer, mixing of the glass fibers, and injection into the mold with the required injection pressures.

The most significant operating difference of the twin screw injection molding machine and an extruder is the ramming of one screw relative to the other. Insight into the special case of the ramming one screw relative to the other can be gained by reviewing the case where once screw rotates at a speed higher than the other, which locally looks like the injection process. Research in the Polymer Mixing Program at the University of Maryland studied the effect of rotating the screws at different speeds. It was found that the mixing was approximately the same as when the screws were set at 50% stagger, since there was a continuous change of stagger between the screws, the overall effect was washed out. It was found that there was significant differences in performance when the screw speeds were slightly different and when they were very different. This is important in understanding the effect of injection speed and screw rotation speed.

The three major design aspects are—drive system design, screw design, and injection. For the mixing of glass fibers (as well as many other mixing situations) the major aspects are—melting, glass fiber addition and mixing, deaeration, and injection. This is chematically shown in FIGS. 3 and 4.

In many polymer mixing problems, the issues of melting, solids addition and mixing, devolatilization or deaeration, and pumping must be addressed. In the case of glass fiber addition, the goal is to include and evenly mix the glass fibers with the minimum breakage. We consider that melting, glass addition and mixing and deaeration are the process steps requiring careful attention.

The invention will be better understood by reference to the attached drawings taken in conjunction with the following discussion.

BRIEF DESCRIPTION OF THE DRAWINGS

FIGS. 5, 7 and 9 show the operation of the non-intermeshing twin screw compounder feeder according to the present invention and how it works to inject product into a female die mold;

FIGS. 6, 8 and 10 depict the operating conditions for the twin screws in FIGS. 5, 7 and 9, respectively; and FIG. 11 depicts a preferred embodiment of a drive unit for the non-intermeshing twin screw compounder feeder.

DETAILED DESCRIPTION OF THE PREFERRED EMBODIMENT

Figure 1:
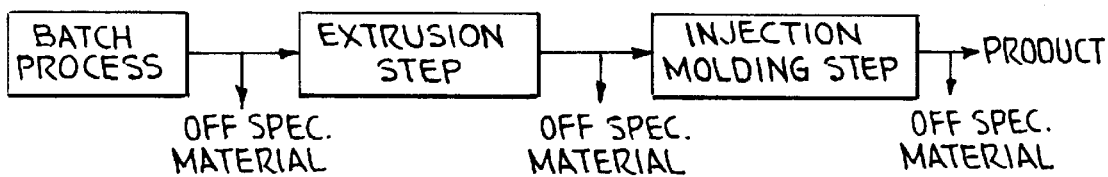
FIG. 1 is a block flow diagram of prior art injection molding technique.
Figure 2:
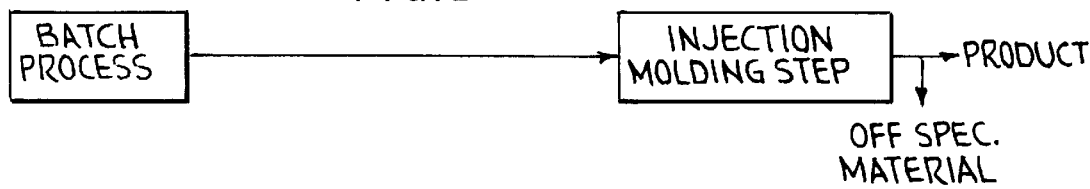
FIG. 2 is a block flow diagram of the present invention.
Figure 3:
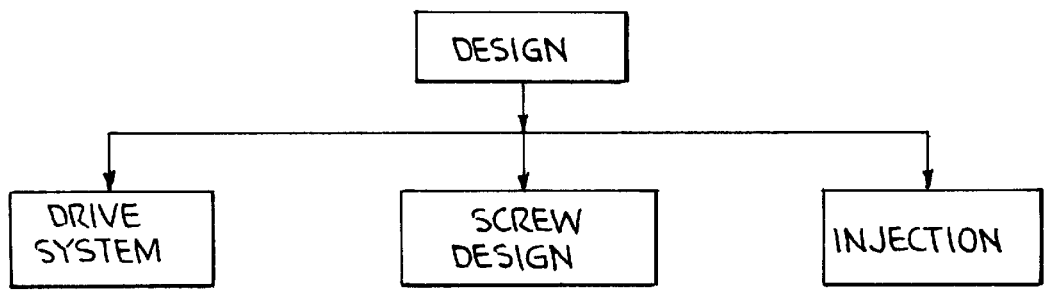
FIGS. 3 and 4 depict design and process techniques.
Figure 4:
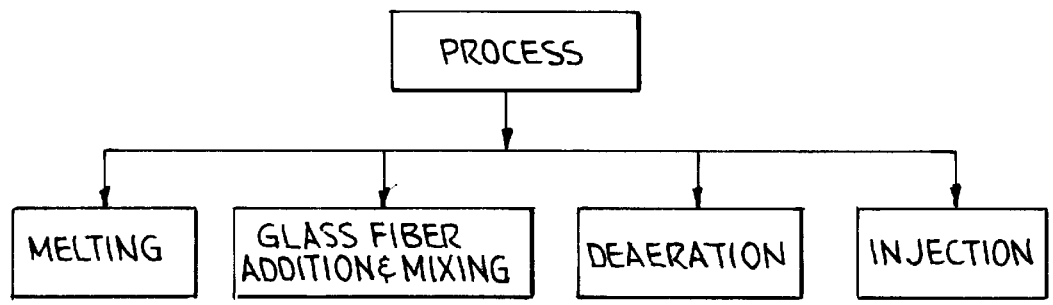

The unit processes of the invention include: first component feeding, melting, second component addition and mixing, deaerating, and injection. FIGS. 5–10 depict the preferred screw design and operating conditions for performing the required unit processes. The discussion of one cycle starts at the end of the packing phase. As shown in FIG. 5, one screw retracts while both screws rotate. The first component (polymer) and second component (glass fibers) are added at the times shown in FIG. 6. The screws start turning at the beginning of the retraction phase and new polymer is injected soon after. FIG. 7 shows the mixing and deaeration phase. The screws are in the fully retracted mode and the screws continue to rotate. FIG. 8 shows that glass fibers continue to be fed for part of the time and then are incorporated into the polymer. A vacuum is applied during this time and deaeration occurs in that section. Now that the glass is incorporated and degassed, the injection step FIG. 9 begins where one screw is pushed forward, and the screws are not turning.

In the non-intermeshing twin-screw extruder (NITSE), melting is accomplished by pumping the material over either cylindrical compounders or double reverse flight elements. Either geometry creates a high stress and flow reorientation, which completes the melting process. Since one screw will be moving axially relative to the other, material flow and alignment of the elements is an issue.

At the end of the packing cycle, the injection screw begins to retract with both screws turning FIG. 5. After it goes back approximately one L/D (FIG. 6), polymer is fed into the feed port and, since the screws are turning, the material in the machine will move toward the injection end. Our design of the machine and process is such that the cylindrical compounders are off-set during the packing phase (FIG. 5). In this way, during the return phase, in which the screw is being pulled back and the screw rotation starts, the cylinders are aligned (FIG. 7).

Our novel design of a twin screw injection molding machine provides a condition where the glass is injected in a partially-filled zone and then mixed in a high reorientation, low shear stress zone to accomplish the glass incorporation with minimal fiber length breakup. The twin screw design allows for the possibility of glass fiber addition into partially-filled channels, which exist right after the cylindrical sections of the melting zone—see FIGS. 5 and 7. The polymer fill of the channel can be controlled by the screw pitch, screw speed, feed rate, and axial travel distance of the injecting screw. This configuration is preferred since it provides the volume necessary for the fiber addition, while retaining a low stress condition. FIG. 8 shows the screw position, screw speed and material feeding status at various phases of the machine operation for one cycle. The process steps include:

1) Feeding of the glass fibers into the partially-filled channels begins during the second half of the return stroke while the screws are turning and the injection screw is being retracted;

2) At the end of the return stroke, the screws will be oriented such that screw elements in the various sections are aligned relative to each other and align the glass fiber mixing section;

3) During the cooling cycle, the screws will continue to rotate at a given speed (this is different than common practice). Since the flow path is closed, the material will stay in place and the glass fibers will be incorporated into the polymer due to the mixing action between the two screws.

The stagger of the screw flights affects the channel-to-channel mixing. Furthermore, different screw geometries exist including double reverse flights or slotted screws for the optimum mixing geometry.

Deaeration

Deaeration is performed in a partially-filled zone immediately after the glass addition and mixing zone (see FIG. 5) and right before the single screw injection zone. Similar to the glass fiber mixing process, deaeration can occur during the cooling cycle while the screws are turning.

Injection

The material must move from the partially-filled channels to filled channels which lead into the single screw extension and finally the injection nozzle. The screws design must have sufficient filled channels to provide material to the front of the screw at the end of the retraction step and create pumping pressure. This process is controlled by screw design and operating parameters.

In this invention, a hybrid machine, which is a cross between an injection and extrusion machine, is provided.

Therefore, we benefit from this mutation as well as inherit the design and operation complications from both machines. For example, the design of the barrel and screws is a well studied subject in the extrusion industry. However, the high pressure requirements and relative axial movement of the screws in our application requires new screw and barrel design concepts. The drive system of the injection molding machine is handled by a hydraulic motor and requires a relatively simple design. However, in the twin screw extrusion machines, due to the severe space limitation between the output shafts and the thrust force caused by the back pressure of the polymer, the design of the drive system is complicated. This problem becomes even more prominent when considering the high pressure requirement for pushing the polymer through the runner into the mold.

Three main issues are addressed for the design of the machine. First, gear box and drive system are the heart of the design process. Second, the barrel must generate the required high pressures for the injection molding industry. The last issue is related to the design of the screws and their relation to the processing. Details of each concept are addressed below.

Design of the Drive System

What is required is a drive system that will turn both screws with sufficient torque to perform the various machine processes (like an extruder) and yet ram one of the screws to get the injection motion and the necessary pressures (like an injection molding machine). Traditionally, there are two main requirements that have to be satisfied in designing the gear box for a twin screw extrusion machine. The first issue is related to the limited distance between the two driving shafts, which restricts the diameters of the gears and in turn limits the amount of power that can be transferred to the screws. The second is the magnitude of the thrust forces on the shafts generated by the polymer, which is being pushed forward by the screws. There are several other concerns specifically related to the design of the twin screw injection molding machine which need to be addressed. FIG. 11 shows a schematic drawing for a preferred embodiment of a suitable drive system. The speed of the electric motor is reduced to 300 to 400 rpm (which is the typical screw speed for a twin screw extruder) through a speed reducer gear box 30 with a reduction ratio of 10:1. The main shaft 10 transfers torque to the auxiliary shaft 20 through gears 31 and 32. These are spur gears and can accommodate for the relative motion in the axial direction and rotation at the same time. The face width of the main gear 31 is equal to the face width of the auxiliary gear 32 plus the required throw length of the reciprocating screw. In this way, the two gears maintain their contact during the axial movement of the auxiliary shaft.

The auxiliary shaft 20 is pushed forward by the hydraulic cylinders 33 and through the pushing plate 34. In FIG. 11, the auxiliary shaft is shown in the forward position. Rotation of the screws cause the forward movement of the polymer and a die head pressure up to 5000 psi is generated by the polymer melt. The reaction to the forward movement of the polymer and the back pressure cause a thrust force which tends to push the screws towards the feed end of the extruder. Thrust bearings 35,36 at the end of the main and auxiliary shafts are provided to resist these thrust forces, which are caused by the rotation of the screws. However, a thrust bearing to handle the axial force in the auxiliary shaft 20 during the injection step would be very large (pressures up to 3000 psi is required to push the polymer into the mold) and this can not be accommodated due to the severe space limitation caused by the close proximity of the two screws. To overcome this problem, a spring 37 is provided at the end of the auxiliary shaft which will allow a limited load on the bearing 36. During the injection, the length of the spring is reduced due to the injection pressure and the auxiliary shaft 20 will touch the pushing plate. This causes the transfer of a large portion of the axial load to the pushing plate directly.

Due to the reciprocating movement of one of the screws, roller or ball bearings cannot be used to support the auxiliary shaft. Therefore, journal bearings are used for this purpose. In the design of the auxiliary shaft, buckling is an important concern because, it is under axial and radial loads caused by the polymer pressure and the acting forces on the gear, respectively. Therefore, in the design of the auxiliary shaft, buckling must also be considered.

In one embodiment we used 2 in. screws in the 100 ton-6 oz. machine provided by Engel. The required throw length for the machine may be 6 in. and a motor with 30 to 40 hp may be used. It is worth noting that in a 2 in. extruder usually a 50 to 100 hp motor is used. However, the L/D (ratio of the length to diameter of the screw) for extruders are much higher than our application (many extruders have L/D>35). In this design an L/D=17 may be used which is less than L/D for the existing injection molding machines (usually 20).

This reduces the required power, increases the reliability of the gear box because the required torque is less.

Design of the Barrel

In extrusion machines, the pressure caused by the rotation of the screws (approx. 5000 psi) is enough to force the material out of the die head for the majority of applications. However, in injection molding machines this pressure is not adequate and much higher pressures (approx. 30000 psi) are required. To generate this pressure, a one way valve is installed at the end of the screw to make it act like a piston during the injection phase. This mechanism is not applicable to the existing twin screw extruder barrels because the pressure would cause the polymer to flow backward through the nip region. To solve this problem, we designed the system with only one screw ramming. This requires the conversion of the twin screw barrel to a single screw barrel at the end of the channel to accommodate the forward motion of the screw and the single nozzle feed into the runners. In this design, the one way valve is installed on the auxiliary screw. The tip of the screw will enter the single screw barrel during the injection and operate like a conventional injection molding machine. In this design, the length of the end channel will be 7 inches to accommodate for the one way valve, its engagement and the 6 inch throw length.

Design of the screw configuration

Unlike the injection molding screw, extrusion screws are modular. These screws can be made by assembling screw elements with various configurations (kneading blocks, reverse flights, cylindrical sections, various pitches, etc.) on a shaft. An important advantage of the modular screw is its design flexibility which can be changed for different processes and materials. In the screw design for this machine (FIGS. 5, 7, and 9), several points should be noticed. a) Material should be removed from the feed section rapidly to permit for the incoming material and achieve the required flow rates. This is done by using screws with large pitch in this section. b) Melting is achieved by a cylindrical section and a double reverse flight screw which provides a complete melting in 3.5 D. c) Fiber glass should be added in a partially filled channel to provide enough free volume for the addition. This is also achieved by screws with larger pitch which convey the material faster and therefore reduce the channel fill. d) Mixing is performed in a low pitch section which provides gentle and efficient mixing. This section ends with a reverse flight which ensures the complete mixing of the fiber glass into the polymer matrix. e) Deaeration should also be performed in a partially filled channel to prevent the material from being sucked out of the machine by the vacuum pump at the vent. f) The last 4.5 D of the screw is used to fill the channel and pressurize the fluid. We expect to fill the last 4D of the channel to provide enough material during the retraction phase. g) Finally, a one-way valve is provided at the end of the auxiliary shaft to provide injection pressures during ramming stage.

The advantages of this machine includes being able to solve a wide range of polymer mixing problems. Other uses for the invention include mixing additives like masterbatch, polymer-polymer blending, etc. In order to evaluate morphology development, the machine may have some special features including: 1) A way to observe morphology development at different locations in the machine, either by locations for a slip stream or by a separate cooling system on the barrel to provide rapid (30–90 seconds) cooling of the polymer (this will be important in order to analyze polymer-polymer mixing processes); 2) A rapid pull screw head (designed by Spirex) which can allow for rapid and easy screw pull capabilities, so that samples in the various sections of the screw can be obtained for later analysis.

Impact of the Invention

We have designed a new generation of injection molding machine that is capable of performing complex compounding and blending tasks. An example of the novel design is glass fibers blending into a polymer, with an increase in final glass fiber length, improved part properties and the savings due to the elimination of the extrusion step. Since the mixing characteristics are improved in the twin screw design, the overall machine can be shorter than a typical single screw machine.

Since we believe this design can be a platform for blending many polymer systems, thereby alleviating one step in the process (extrusion) and its incumbent reduction of product properties. Alternative embodiments are important systems where the extrusion step can be eliminated from the process, such as systems which control various classes of mixing of miscible and immiscible polymeric systems to identify which systems.

The advantages of this novel injection molding machine design are:

1) Removal of the extrusion step in the process:
   Compounding in one machine eliminates the middle-man (compounding companies), which could, in some cases, save up to 40% of the price of the material and also reduce the magnitude of the molders' material inventory. For example, polycarbonate (PC) sells for $1.64/lb and ¼" length fiberglass sells for $1.00/lb. The material cost for a 20% glass filled PC would be $1.51; whereas, the market price is $2.12 [6] which represents profit. The implementation of the design is economical because the major parts of the extrusion machine (i.e., drive system, barrel, heating, screw and control systems) already exist in the injection molding machine.

2) Reduction in the energy consumption:
   Removing the duplicate steps such as melting, pumping, cooling, mixing and material handling will result in substantial energy savings.

3) Improvement of material properties:
   Polymers are heat and shear sensitive materials. Reduction of the heat and shear history by elimination of the extrusion step will result in the improvement of the physical and chemical properties of the polymer [5].

4) Reduction in recycle streams:
   Each processing step produces scrap and off-specification parts. Elimination of a processing step naturally reduces the amount of waste. Moreover, another advantage will be the possibility of on-line control of the properties of the material, allowing for the correction of any problem within a few machine cycles. The existing practice in the molding industry is that if the resin does not perform to the expectation, then the problem is referred to the compounder or resin producer. If the problem can not be resolved for any reason, then the whole order is sent back (which usually ends up in the recycle stream) and the molder should wait until a new batch is compounded and shipped (which might or might not solve the processing problem). For complex applications this process can occur several times before being resolved.

5) Real-time control of the product quality:
   Since all of the blending is occurring on the injection molding machine, the operator has more control over product properties and can make on-line adjustments to the quantities of the ingredients used for blending the material. This substantially reduces the rejected resins and improves the batch to batch uniformity. Moreover, the properties of the product (e.g., strength, impact resistance, shrinkage, etc.) can be fine-tuned or modified in situ without the need to order new formulation from the compounder or resin manufacturer. This will minimize the material requirements for the various molders' products.

6) Knowledge base model for the morphology development in the injection molding machine:
   With the rapid increase in the use of compounded materials for production of injection molded parts, study of the morphology development in the injection molding machine and the effect of the processing on it becomes essential. The effect of the processing conditions on the properties of the polymer is a well known fact in the extrusion industry. However, for various reasons, the injection molding industry has ignored the role of processing in the product quality until recently. One of the goals of this study is to investigate the role of mixing and morphology development in the injection molding environment and suggest a unified theory for this purpose.

7) Reduction of the length of the machine:
   This is an important concern for the injection molding industry due to the space restrictions and design limitations caused by the large size of the existing machines. The standard length to diameter ratio of the screw, L/D, for an injection molding machine is around 24. Our proposed design can perform the same job in half of this length. One reason is the melting mechanism in the twin screw extruder typically occurs in half 1–2L/D (versus 6L/D for a single screw extruder) and the mixing lengths can be less.

This design uses two screws for the melting, mixing, pumping and molding of the polymers. The design eliminates the extrusion step before injection molding. Existing machines have only one screw.

Alternative embodiments of the invention include:

1) Intermeshing and non-intermeshing twin screw injection molding machines.

2) Co-rotating and counter-rotating twin screw injection molding machines.

3) Twin screw injection molding machines for purposes other than mixing and compounding.

4) Reciprocating screws (one or two).

5) Rotation of the screws during pack and cooling cycles.

6) Addition of secondary materials (solids such as glass fibers or talc or additives such as low molecular weight liquids or polymers) into partially filled screw channels.

7) Mixing of glass fibers in low stress geometry resulting in longer fiber length.

We claim:

1. A combination of a female die mold and a compounder feeder apparatus for mixing materials prior to being directly injected into the female die mold, said compounder feeder apparatus comprising first and second parallel screws having mixing discs attached thereto, the mixing discs of said first and second screws being spaced and non-interengaging, and drive means mounting said first and second screws so as to rotate said screws and to move said second screw axially toward and away from said female die mold so as to both mix said materials and inject said mixed materials directly into said female die mold.

2. The combination according to claim 1, wherein said drive means comprises interengaging first and second gears connected to said first and second screws, said second gear being axially movable along said first gear, a drive motor for rotating said first screw, and a drive cylinder connected to said second screw to move it axially toward and away from said female die mold.

3. The combination according to claim 2, including a gear box connected between said drive motor and said second screw.

4. A compounder feeder apparatus for mixing materials prior to being directly injected into a female die mold, said compounder feeder apparatus comprising first and second parallel screws having mixing discs attached thereto, the mixing discs of said first and second screws being spaced and non-interengaging, and drive means mounting said first and second screws so as to rotate said screws and to move said second screw axially toward and away from said female die mold so as to both mix said materials and inject said mixed materials directly into said female die mold.

5. A compounder feeder apparatus according to claim 4, wherein said drive means comprises interengaging first and second gears connected to said first and second screws, said second gear being axially movable along said first gear, a drive motor for rotating said first screw, and a drive cylinder connected to said second screw to move it axially toward and away from said female die mold.

6. A compounder feeder apparatus according to claim 5, wherein a gear box connected between said drive motor and said second screw.

* * * * *